(12) United States Patent
Tamura et al.

(10) Patent No.: US 7,665,905 B2
(45) Date of Patent: Feb. 23, 2010

(54) OPTICAL MODULE AND METHOD FOR MAKING THE SAME

(75) Inventors: Mitsuaki Tamura, Yokohama (JP); Wataru Sakurai, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 12/247,648

(22) Filed: Oct. 8, 2008

(65) Prior Publication Data

US 2009/0097802 A1    Apr. 16, 2009

(30) Foreign Application Priority Data

Oct. 16, 2007    (JP) ............................. 2007-268924

(51) Int. Cl.
*G02B 6/36* (2006.01)
(52) U.S. Cl. .......................................... 385/88; 385/78
(58) Field of Classification Search .................. 385/88, 385/78
See application file for complete search history.

(56) References Cited

U.S. PATENT DOCUMENTS

| 6,203,212 | B1 | 3/2001 | Rosenberg et al. | |
|---|---|---|---|---|
| 6,536,957 | B1 * | 3/2003 | Buchter | 385/89 |
| 6,910,812 | B2 * | 6/2005 | Pommer et al. | 385/92 |
| 6,952,532 | B2 * | 10/2005 | Dair et al. | 398/139 |
| 7,104,703 | B2 * | 9/2006 | Nagasaka et al. | 385/88 |
| 7,118,294 | B2 * | 10/2006 | Hamasaki et al. | 385/89 |
| 7,129,722 | B1 * | 10/2006 | Brophy et al. | 324/753 |
| 7,136,594 | B2 * | 11/2006 | Nakanishi et al. | 398/164 |
| 7,255,489 | B2 * | 8/2007 | Krahenbuhl et al. | 385/88 |
| 7,401,983 | B2 * | 7/2008 | Sakurai et al. | 385/88 |
| 2001/0030789 | A1 * | 10/2001 | Jiang et al. | 359/152 |
| 2002/0030872 | A1 * | 3/2002 | Dair et al. | 359/152 |
| 2002/0033979 | A1 * | 3/2002 | Dair et al. | 359/152 |
| 2002/0126356 | A1 * | 9/2002 | Nakanishi et al. | 359/163 |
| 2003/0113071 | A1 * | 6/2003 | Kim et al. | 385/76 |
| 2003/0201462 | A1 * | 10/2003 | Pommer et al. | 257/200 |
| 2004/0022487 | A1 * | 2/2004 | Nagasaka et al. | 385/31 |
| 2004/0252951 | A1 * | 12/2004 | Nagasaka et al. | 385/88 |
| 2006/0028926 | A1 * | 2/2006 | Terada et al. | 369/13.17 |
| 2006/0110096 | A1 * | 5/2006 | Terada et al. | 385/14 |

FOREIGN PATENT DOCUMENTS

| JP | 2000-082830 A | 3/2000 |
|---|---|---|
| JP | 2006-047682 A | 2/2006 |
| JP | 2007-093731 A | 4/2007 |

* cited by examiner

*Primary Examiner*—K. Cyrus Kianni
(74) *Attorney, Agent, or Firm*—Global IP Counselors, LLP

(57) ABSTRACT

The optical module includes a ferrule having a fiber holding hole, a flexible printed circuit (FPC) board provided to one end of the ferrule, an optoelectric device connected to an electric circuit of the FPC board, and a built-in fiber held in the fiber holding hole in a state in which one end of the fiber faces the optoelectric device, and another end of the fiber is flush with an end surface of another end of the ferrule. The method includes insert-molding a ferrule having a fiber holding hole with one end of the ferrule being positioned with respect to a FPC board; connecting an optoelectric device to an electric circuit of the FPC board; inserting and securing a built-in fiber into the fiber holding hole; and polishing an end surface of the fiber so that an end surface of another end of the ferrule is flush with the end surface of the fiber.

11 Claims, 6 Drawing Sheets

OPTICAL MODULE AND METHOD FOR MAKING THE SAME

BACKGROUND OF THE INVENTION

1. Field of the Invention

The present invention relates to an optical module which includes an optoelectric device and is to connect an electrical circuit and an optical fiber, and to a method for manufacturing the same.

2. Description of the Background Art

The development of broadband communication has been accompanied by a demand for greater speeds and larger capacities in routers on network nodes and in information appliances. In response thereto, progress is being made in terms of introducing optical interconnections in which an optoelectric conversion is performed at an input or output portion for electric transmission, and high-speed, high-capacity transmissions are performed by utilizing the broadband properties of optical fiber.

An optical communications assembly whose main portion is directly formed on a flexible circuit board by injection molding or another molding process is disclosed in Japanese Patent Laid-Open No. 2000-82830. This optical module and the manufacturing method therefore employ a lens array and other expensive components, and thus, the entire optical module becomes expensive, making it difficult to keep cost under control.

An optical module having a surface-output-type light-emitting device mounted on one surface of a flexible printed circuit board, and a ferrule having an optical fiber in it disposed on the other surface of the flexible printed circuit board is disclosed in Japanese Patent Laid-Open No. 2006-47682. In the optical module and the manufacturing method therefore, the light-emitting portion of the surface-output-type light-emitting device is not readily visible, and therefore must be aligned using an image-recognition device. The alignment is difficult to perform, reducing the suitability of the module for mass production.

SUMMARY OF THE INVENTION

One object of the present invention is to provide an optical module and method for manufacturing the same that can reduce expense and improve manufacturability.

In order to achieve the object, there is provided an optical module that is adopted to be connected to an optical fiber. The optical module includes (1) a ferrule having a fiber holding hole, (2) a flexible printed circuit board provided to a first end of the ferrule, (3) an optoelectric device connected to an electric circuit of the flexible printed circuit board, and (4) a built-in fiber held in the fiber holding hole in a state in which a first end of the built-in fiber faces the optoelectric device, and the second end of the built-in fiber is flush with an end surface of the second end of the ferrule.

The flexible printed circuit board may have a fiber through-hole. The first end of the built-in fiber may project from the first end of the ferrule so that the built-in fiber may pass through the fiber through-hole. A guide pin holes may be present on the second end of the ferrule. The ferrule may have a protrusion, the flexible printed circuit board may have a positioning hole, and the protrusion and the positioning hole may be fitted together.

According to another aspect, there is provided a method for manufacturing an optical module including (1) insert-molding a ferrule having a fiber holding hole with a first end the ferrule being positioned with respect to a flexible printed circuit board; (2) connecting an optoelectric device to an electric circuit of the flexible printed circuit board; (3) inserting and securing a built-in fiber into the fiber holding hole; and (4) polishing an end face of the built-in fiber so that an end surface of the second end of the ferrule is flush with the end surface of the built-in fiber.

DETAILED DESCRIPTION OF THE INVENTION

The above mentioned features and other features, aspects, and advantages of the present invention will be better understood through the following description, appended claims, and accompanying drawings. In the explanation of the drawings, an identical mark is applied to identical elements and an overlapping explanation will be omitted.

Figure 1:
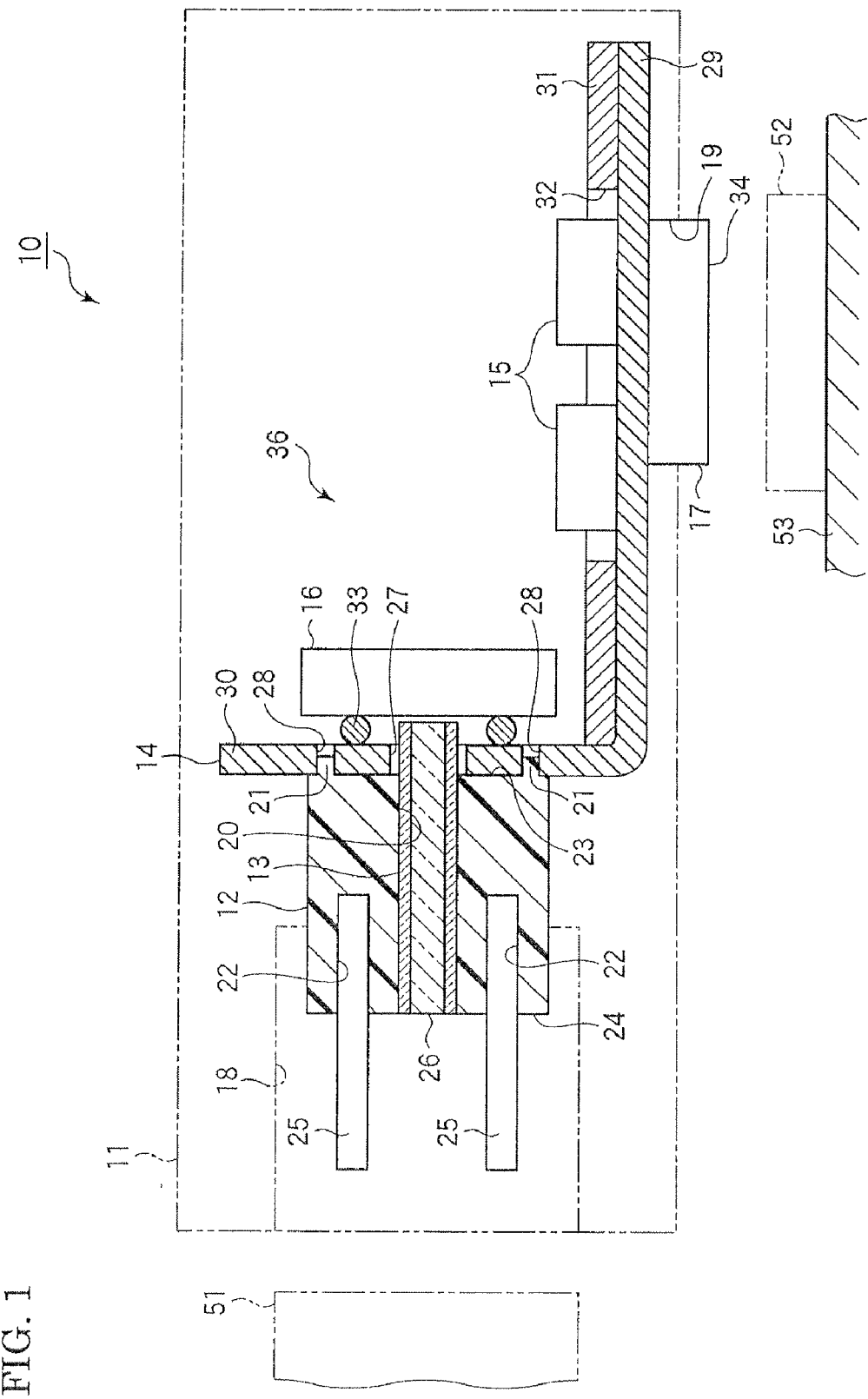
FIG. 1 is a schematic diagram showing an optical module according to an embodiment of the present invention, and a corresponding optical connector and electrical connector which are connected thereto.

FIG. 1 is a schematic diagram showing an optical module 10 according to an embodiment of the present invention, and a corresponding optical connector 51 and electrical connector 52 which are connected thereto. The optical module 10 mainly comprises a housing 11, a ferrule 12, a built-in fiber 13, a flexible printed circuit board 14, an electronic component 15, a photo detector 16, and an electrical connector 17.

The housing 11 is made of, e.g., a resin, and has an optical connector installation part 18 and an electrical connector supporting part 19. The optical connector installation part 18 is formed in the shape of a rectangular hole enclosing the ferrule 12 on a left end where the optical ferrule 12 is disposed. The electrical connector supporting part 19 supports the electrical connector 17 at the lower right while allowing the electrical connector 17 to protrude. The MT connector 51 is installed in the optical connector installation part 18.

The optical ferrule 12 is made of a resin, and is insert-molded together with the flexible circuit board 14, whereby an optical fiber holding hole 20, protrusions 21, 21, and guide pin holes 22, 22 are formed and therefore fixed to one another. The fiber holding hole 20 is formed passing through a central part of the ferrule 12 from one end surface 23 to the other end surface 24. The protrusions 21, 21 constitute a part of positioning means, and are formed as round shafts protruding at either side of the fiber holding hole 20 at the end surface 23 of the ferrule 12. The guide pin holes 22, 22 are formed as holes that run parallel to the fiber holding hole 20, originating from the end surface 24 of the ferrule 12 and heading toward the end surface 23. Guide pins 25, 25 are inserted into the guide pin holes 22, 22, and secured therein.

The built-in fiber 13 is inserted into the fiber holding hole 20 and secured therein. One end of the built-in fiber 13 (the end near the flexible printed circuit board 14) protrudes from the end surface 23 of the ferrule 12. The surface on the other end of the built-in fiber 13 (a polished surface 26) is polished to be flush with the other end surface 24 of the ferrule 12.

The flexible printed circuit board 14 is obtained by printing or otherwise forming a circuit pattern on a substrate comprising a thermoplastic polyphenylene sulfide resin material, a liquid crystal polymer resin material, a thermosetting epoxy resin material, or other similar materials. The flexible printed circuit board 14 has the shape of a letter "L" and comprises a long part 29 and a short part 30.

A fiber through-hole 27 is formed as a round hole passing through substantially the center of the short part 30. The built-in fiber 13 projecting from the end 23 of the ferrule 12 passes through the fiber through-hole 27. A plurality of positioning holes 28, 28 on the periphery of the fiber through-hole 27 are formed as round holes passing through the short part 30. The number of the positioning holes 28 as well as the number of the protrusions 21 is preferably two. The positioning holes 28, 28, together with the protrusions 21, 21 of the ferrule 12, constitute positioning means, whereby the relative positions of the flexible printed circuit board 14 and the ferrule 12 are adjusted.

A reinforcing plate 31 for increasing the rigidity of and preventing any disturbance to the flexible printed circuit board 14 is fastened to an upper surface of the long part 29. A plurality of electronic components 15 is mounted inside a device anchoring hole 32 formed in the reinforcing plate 31. The electrical connector 17 is mounted on a lower surface of the long part 29.

The photo detector 16 is a comparatively inexpensive optical device called a long wave-length vertical cavity surface emitting laser or a photodiode array. The photo detector 16 is mounted on the flexible printed circuit board 14 via a fixed member 33 and is optically connected to the built-in fiber 13. The photo detector 16 converts the optical signal received from the built-in fiber 13 to electricity, and transmits the electricity to the electronic components 15 via an electrical circuit arranged on the flexible printed circuit board 14.

On the electrical connector 17, a fitting opening 34 is disposed from the lower surface of the long part 29 toward the underside of the housing 11. As a result of the corresponding connector 52 being installed, the electrical connector 17 transmits the electrical signal converted by the electronic components 15 to a control circuit substrate 53 upon which the corresponding connector 52 is mounted.

Figure 2:
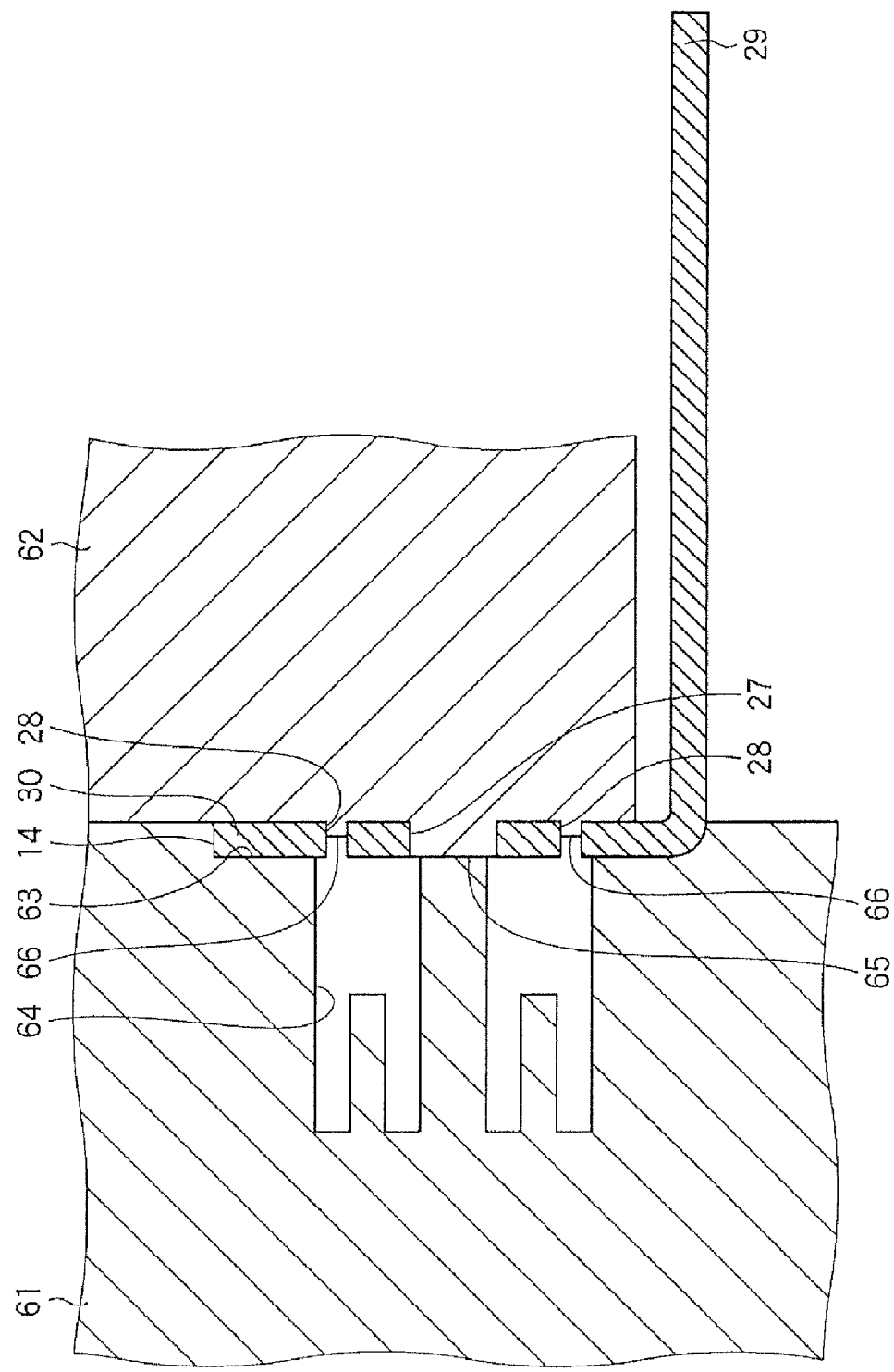
FIG. 2 is a partial cross-sectional view of a flexible printed circuit board, a first die, and a second die in a first step of a method for manufacturing the optical module according to an embodiment of the present invention.

The method for manufacturing the optical module 10 shall now be described. FIG. 2 is a partial cross-sectional view of the flexible printed circuit board 14, a first die 61, and a second die 62 in a first step of a method for manufacturing the optical module 10 according to an embodiment of the present invention. In the first step, the first die 61 and the second die 62 are used for molding the ferrule 12 which is integrated with the flexible printed circuit board 14. The fiber through-hole 27 and the positioning holes 28, 28 are formed in advance in the short part 30 of the flexible printed circuit board 14.

The first die 61 comprises a concave part 63 for holding the short part 30 of the flexible printed circuit board 14, and a ferrule-molding cavity 64, which is a continuation of the concave part 63. The second die 62 comprises a first protruding part 65, which is inserted into the fiber through-hole 27 of the flexible printed circuit board 14; and second protruding parts 66, 66, which are to be inserted into the positioning holes 28, 28 of the flexible printed circuit board 14 communicating with the cavity 64 of the first die 61.

In the first step, the short part 30 of the flexible printed circuit board 14 is accommodated in the concave part 63 of the first die 61. Subsequently, the first protruding part 65 of the second die 62 is inserted into the fiber through-hole 27 of the flexible printed circuit board 14, the second protruding parts 66, 66 of the second die 62 are inserted into the positioning holes 28, 28 of the flexible printed circuit board 14, and the dies 61, 62 are closed. A molding resin is subsequently injected into the cavity 64 of the first die 61 from an injection port (not shown).

Figure 3:
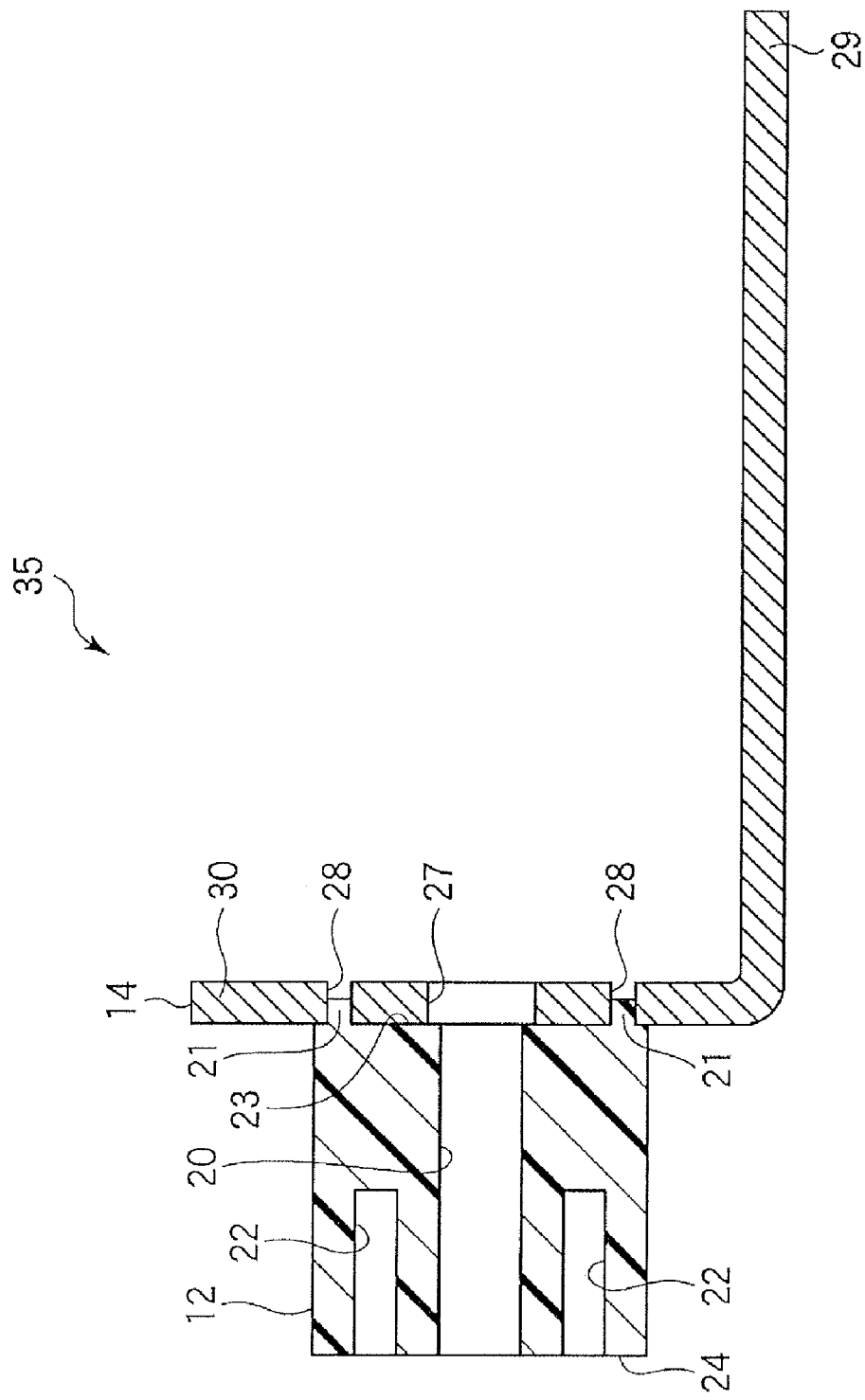
FIG. 3 is a partial cross-sectional view of a first assembly manufactured in the first step.

FIG. 3 is a partial cross-sectional view of a first assembly 35 manufactured in the first step. The first step concludes, and the dies 61, 62 are opened, whereby the first assembly 35 is produced. The first assembly 35 comprises the ferrule 12 and the flexible printed circuit board 14 that has been integrally molded and attached to the ferrule 12. The ferrule 12 comprises the protrusions 21, 21, which are inserted into the positioning holes 28, 28 of the flexible printed circuit board 14; the fiber holding hole 20, which communicates with the fiber through-hole 27 of the flexible printed circuit board 14; and the guide pin holes 22, 22.

Figure 4:
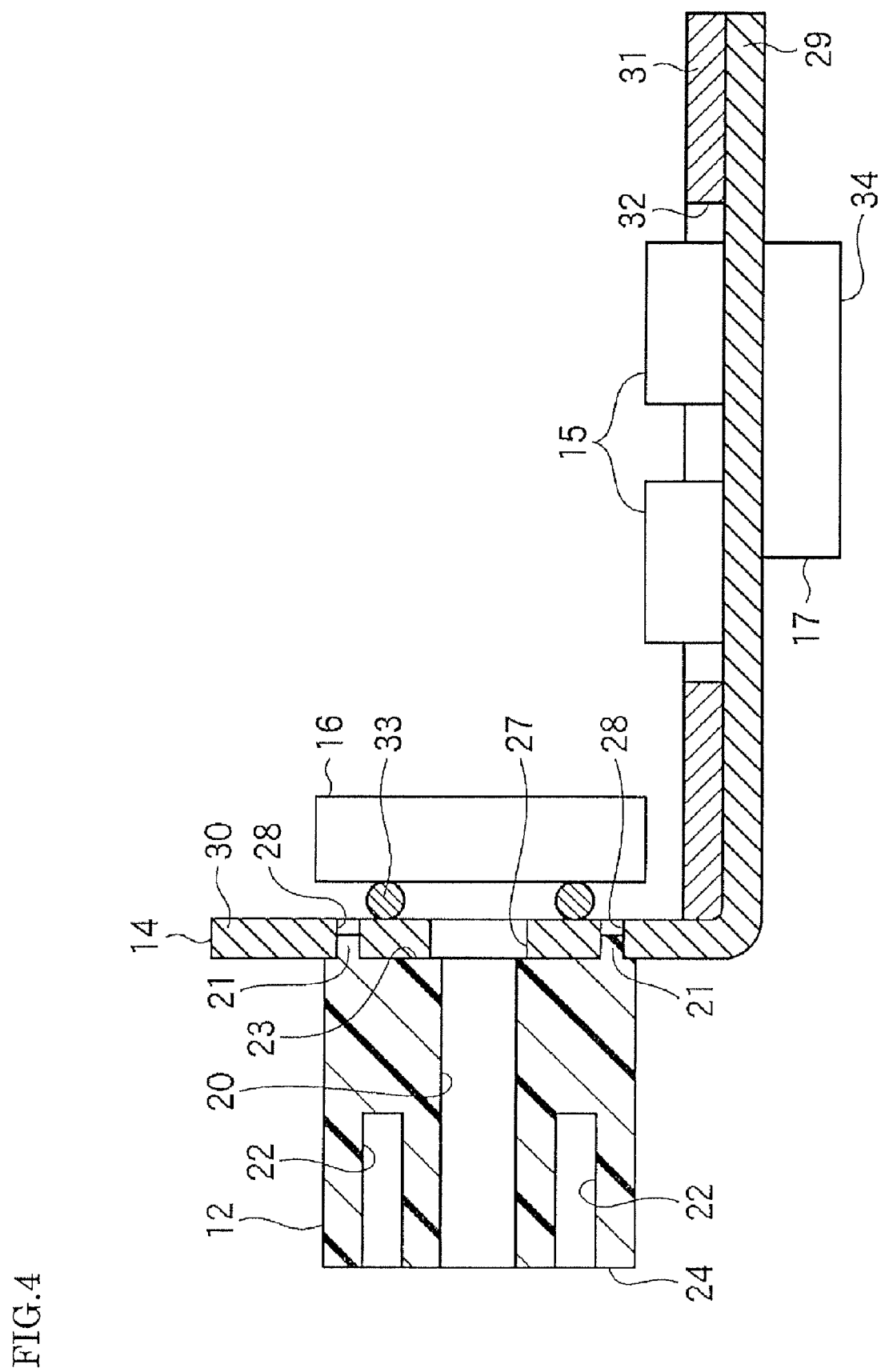
FIG. 4 is a partial cross-sectional view including an assembly obtained in a second step of the method for manufacturing the optical module according to the embodiment of the present invention.

FIG. 4 is a partial cross-sectional view including an assembly in a second step of the method for manufacturing the optical module 10. Next, in the second step, the photo detector 16 is positioned concentrically with respect to the fiber through-hole 27 of the flexible printed circuit board 14 with image processing. In this state, the photo detector 16 is mounted on the electrical circuit of the flexible printed circuit board 14 interposed by the fixed member 33, which comprises a metal bump or solder. At the same time, the reinforcing plate 31 is secured to, and the electronic components 15 and the electrical connector 17 are mounted on, the flexible printed circuit board 14.

Figure 5:
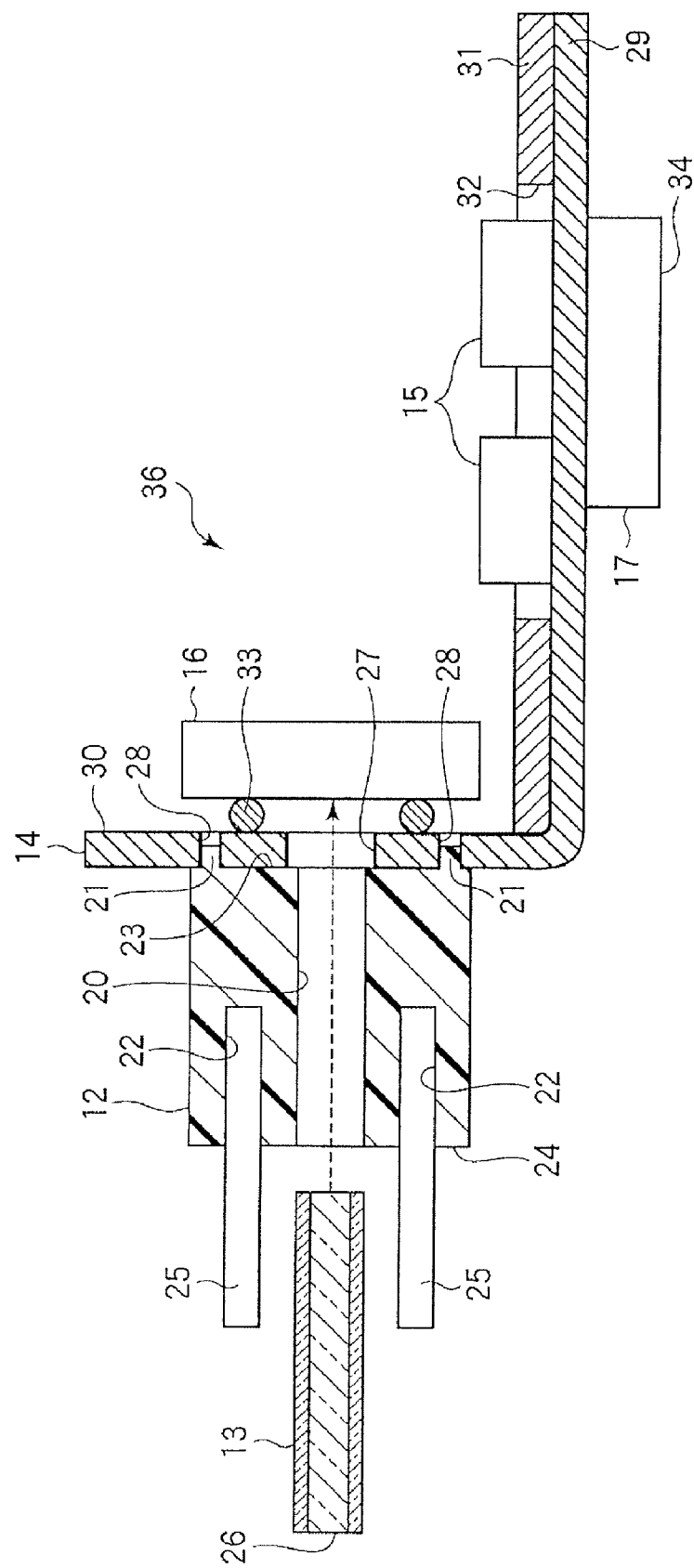
FIG. 5 is a partial cross-sectional view including an assembly obtained in a third step of the method for manufacturing the optical module according to the embodiment of the present invention.

FIG. 5 is a partial cross-sectional view including an assembly in a third step of the method for manufacturing the optical module 10. In the third step, the built-in fiber 13 is inserted into the fiber holding hole 20 of the ferrule 12. The guide pins 25, 25 are inserted into and secured within the guide pin holes 22, 22 of the ferrule 12.

Figure 6:
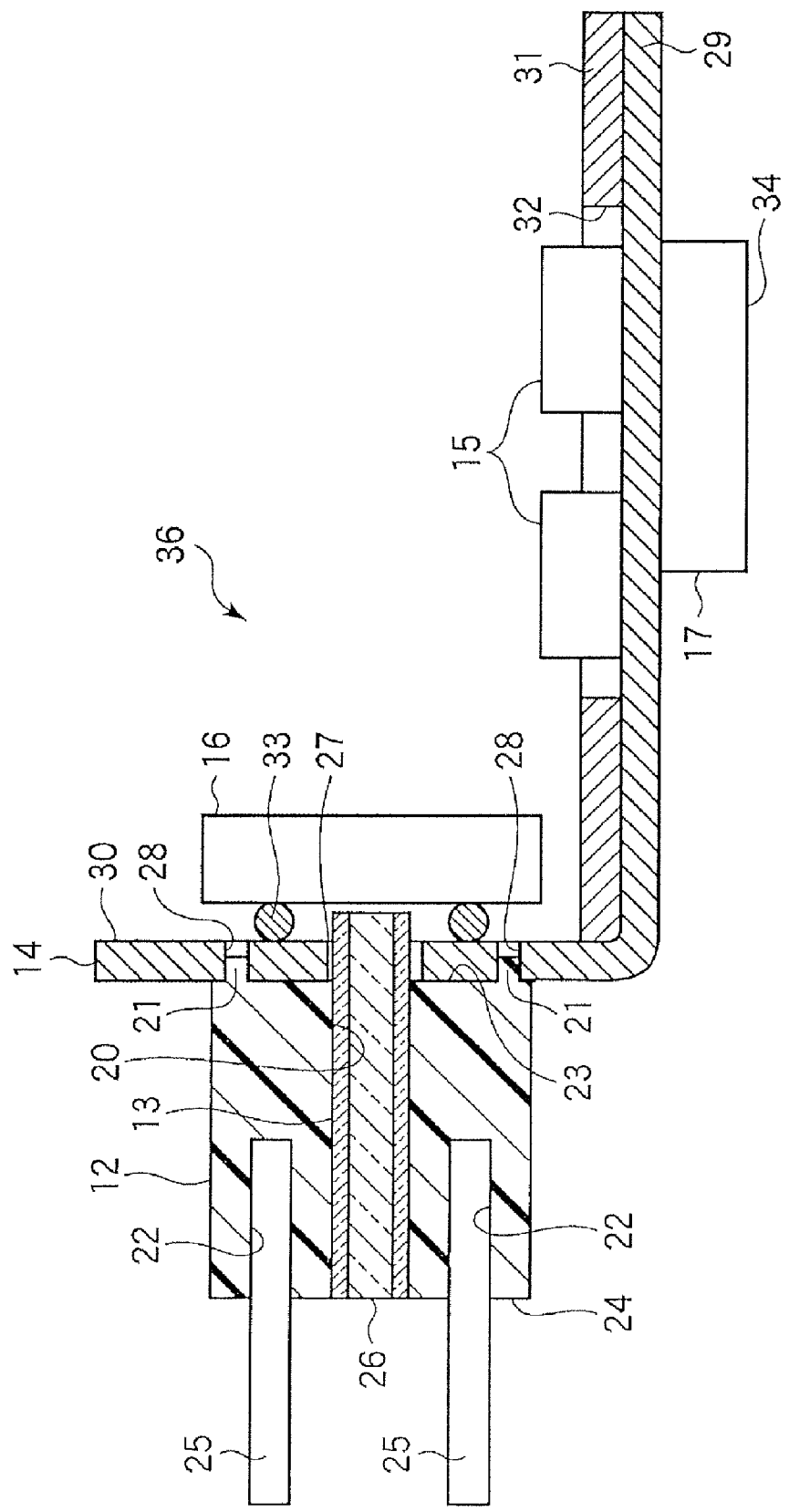
FIG. 6 is a partial cross-sectional view of a second assembly manufactured in the third step.

FIG. 6 is a partial cross-sectional view of a second assembly 36 manufactured by the third step. When the third step has concluded, one end of the built-in fiber 13 will be optically connected to the photo detector 16. The other end of the built-in fiber 13 is polished, and the polished surface 26 is aligned with the end surface 24 of the ferrule 12, whereby the second assembly 36 is manufactured. Finally, a resin material is injected into a metal die (not shown) so as to include periphery of the ferrule 12 of the second assembly 36, whereby the housing 11 (FIG. 1) comprising the optical connector installation part 18 and the electrical connector supporting part 19 is manufactured.

In the optical module 10, the MT connector 51, which includes the optical fiber, is installed in the optical connector installation part 18 of the housing 11, and the corresponding connector 52 is installed in the electrical connector 17. Consequently, the photo detector 16 processes optical data received from the other optical fiber via the built-in fiber board 13, transmits the data as an electrical signal to the electronic components 15, and the electric signal is transmitted from the electrical connector 17 to the control circuit substrate 53 via the corresponding connector 52.

As has been described above, in the optical module 10 of the present embodiment, the protrusions 21, 21 provided to one end of the ferrule 12 are positioned and affixed in the positioning holes 28, 28 of the flexible printed circuit board 14; and the built-in fiber 13 is inserted into and held in the fiber holding hole 20 of the ferrule 12 positioned by the flexible printed circuit board 14. Consequently, the precision with which the built-in fiber 13 is positioned can be readily improved without complicated means, allowing costs to be reduced and manufacturability to be improved.

According to the optical module 10 of the present embodiment, the built-in fiber 13 passes through the fiber through-hole 27 of the flexible printed circuit board 14 positioned on the ferrule 12, and is optically connected to the photo detector 16. Therefore, the gap between the built-in fiber 13 and the photo detector 16 can be set irrespectively of the thickness of the flexible printed circuit board 14.

According to the optical module 10 of the present embodiment, the MT connector 51 is mechanically connected to the ferrule 12, and is connected with the guide pins 25, 25. The guide pins 25, 25 are held in the guide pin holes 22, 22 of the ferrule 12. Therefore, a reliable optical connection can be established between the optical fiber and the built-in fiber 13 while the margin of optical loss is lowered.

According to the optical module 10 of the present embodiment, the flexible printed circuit board 14 is positioned by the protrusions 21, 21 of the ferrule 12 fitting into the positioning holes 28, 28. Therefore, the flexible printed circuit board 14 is clasped by the ferrule 12, and a solid, secure structure can be obtained without requiring bonding or other joining means.

According to the method for manufacturing the optical module of the present embodiment, the flexible printed circuit board 14 is positioned inside the dies 61, 62 and the ferrule 12 is insert-molded, whereupon the photo detector 16 is connected to the electronic components 15 on the flexible printed circuit board 14. Subsequently, the built-in fiber 13 is inserted into and secured within the fiber holding hole 20 provided in the ferrule 12, and the built-in fiber 13 is polished so as to have the same end surface as that of the ferrule 12, whereby the optical module 10 is manufactured. Consequently, the precision with which the built-in fiber 13 is positioned can be readily improved without complicated means, so that the optical module 10 can be manufactured while allowing costs to be reduced and manufacturability to be improved.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims. For example, the optoelectric device may also be a light-emitting device. The optoelectric device, the fiber holding hole, and the built-in fiber may also be arranged in a plurality of arrays. The protrusions and positioning holes that constitute the positioning means, and the guide pin holes and guide pins are not limited to being provided in respective sets of two as shown in the drawings, but may be present in a plurality or a plurality of pairs. The protrusions formed in the ferrule need not be disposed on either side of the fiber holding hole, and may indeed be of a cylindrical shape designed to fit within the inner peripheral surface of the fiber through-hole of the flexible printed circuit board.

The entire disclosure of Japanese Patent Application No. 2007-268924 filed on Oct. 16, 2007 including specification, claims drawings and summary are incorporated herein by reference in its entirety.

What is claimed is:

1. An optical module adopted to be connected to an optical fiber, comprising:
   a ferrule having a fiber holding hole, a first end and a second end configured for mechanical coupling to an optical connector having the optical fiber;
   a flexible printed circuit board fixed to the first end of the ferrule;
   an optoelectric device connected to an electric circuit of the flexible printed circuit board such that the optoelectric device is aligned with the fiber holding hole;
   a built-in fiber secured in the fiber holding hole with a first end of the built-in fiber facing the optoelectric device, and a second end of the built-in fiber being flush with an end surface of the second end of the ferrule such that the second end of the built-in fiber is configured for optical coupling to the optical fiber; and
   a housing at least partially enclosing the ferrule, the housing having an optical connector installation opening with the second end of the built-in fiber being exposed within the optical connector installation opening.

2. The optical module according to claim 1, wherein
the flexible printed circuit board has a fiber through-hole, and
the first end of the built-in fiber projects from the first end of the ferrule so that the built-in fiber passes through the fiber through-hole.

3. The optical module according to claim 2, wherein
the ferrule has guide pin holes formed on the second end of the ferrule.

4. The optical module according to claim 2, wherein
the ferrule has a protrusion,
the flexible printed circuit board has a positioning hole, and
the protrusion and the positioning hole are fitted together.

5. The optical module according to claim 1, wherein
the ferrule has guide pin holes formed on the second end of the ferrule.

6. The optical module according to claim 5, further comprising:
   guide pins installed in the guide pin holes of the second end of the ferrule.

7. The optical module according to claim 6, wherein
the optical connector installation opening and the guide pins are dimensioned to mate with the optical connector that includes the optical fiber.

8. The optical module according to claim 1, wherein
the ferrule has a protrusion,
the flexible printed circuit board has a positioning hole, and
the protrusion and the positioning hole are fitted together.

9. The optical module according to claim 1, wherein
the ferrule is molded such that the ferrule is fixed to the flexible printed circuit board to form a single unitary structure with the flexible printed circuit board.

10. The optical module according to claim 9, wherein
the optoelectric device is mounted on the flexible printed circuit board.

11. The optical module according to claim 1, wherein
the optical connector installation opening is dimensioned to mate with an optical connector that includes the optical fiber.

* * * * *